United States Patent [19]

Hetmann et al.

[11] Patent Number: 4,571,884
[45] Date of Patent: Feb. 25, 1986

[54] ARRANGEMENT FOR LOWERING AND LIFTING OF A WINDOW OF A MOTOR VEHICLE DOOR

[75] Inventors: Richard Hetmann, Tamm; Hermann Ziegler, Renningen, both of Fed. Rep. of Germany

[73] Assignee: Dr. Ing. h.c.F. Porsche A.G., Fed. Rep. of Germany

[21] Appl. No.: 568,639

[22] Filed: Jan. 6, 1984

[30] Foreign Application Priority Data

Jan. 14, 1983 [DE] Fed. Rep. of Germany ....... 3301071

[51] Int. Cl.⁴ .......................... B60J 1/08; E05F 15/00
[52] U.S. Cl. .......................................... 49/72; 49/30; 49/280; 296/117
[58] Field of Search ..................................... 49/26–28, 49/279, 280, 30, 51, 255, 166, 72

[56] References Cited

U.S. PATENT DOCUMENTS

| 3,584,912 | 6/1971 | Leger | 49/280 X |
| 3,622,197 | 11/1971 | Vogelei | 49/280 X |
| 4,351,016 | 9/1982 | Felbinger | 49/28 X |

FOREIGN PATENT DOCUMENTS 1562318 3/1980 United Kingdom .

Primary Examiner—Kenneth Downey
Attorney, Agent, or Firm—Craig & Burns

[57] ABSTRACT

An arrangement for the lowering and lifting of a window of a motor vehicle door which includes a window lifter mechanism with a driving motor and an operating switch; for improving the closing operation of the vehicle door, particularly with regard to noise, the driving motor is adapted to be influenced by a control installation in such a manner that preferably during the opening of the door the window is displaced into a lowered position and after completion of the closing of the door is again raised into its upper end position.

15 Claims, 7 Drawing Figures

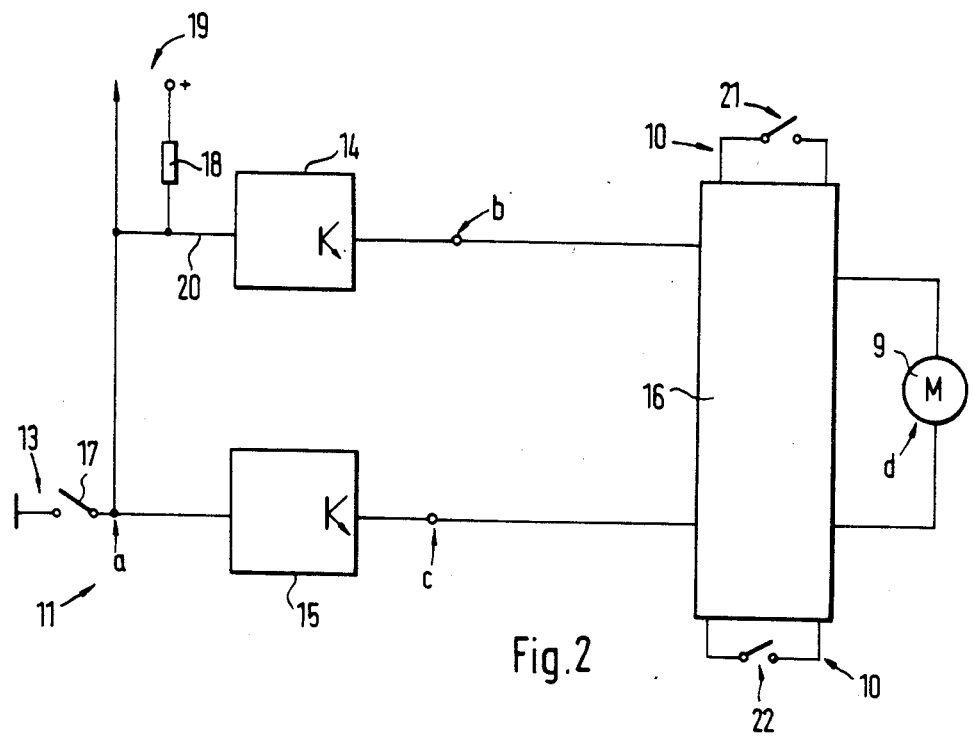
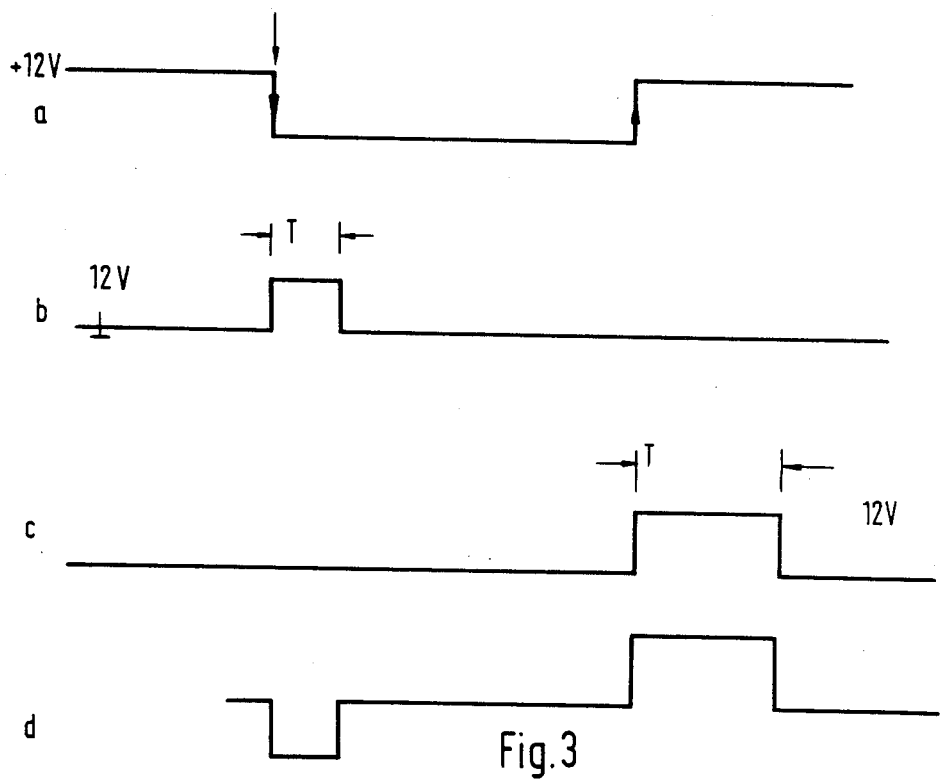
Fig.2
Fig.3

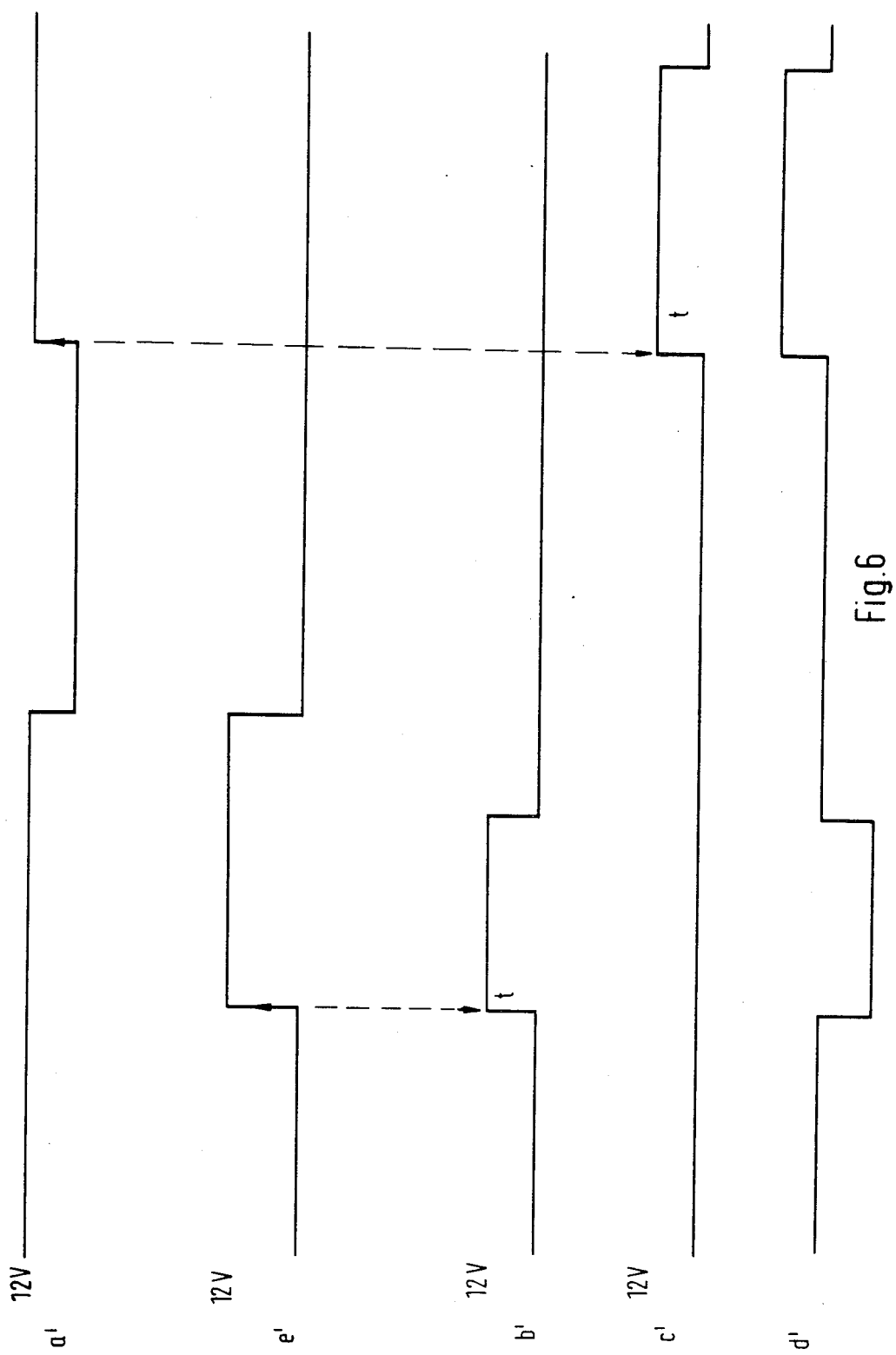

ARRANGEMENT FOR LOWERING AND LIFTING OF A WINDOW OF A MOTOR VEHICLE DOOR

The present invention relates to an arrangement for the lowering and lifting of a windowpane of a motor vehicle door, having a lifter mechanism with a driving motor and an operating switch.

It is known in motor vehicles to couple the window-lifter mechanism with a driving motor for the adjustment of the window, whereby the driving motor is actuated by means of an operating switch arranged in the passenger space. For reasons of safety against theft, it is necessary to move the window into its upper end position prior to leaving the vehicle. This prior art construction entails the disadvantage that the subsequent closing of the vehicle door causes a disturbing and annoying noise since the air present in the passenger space is compressed by the door closing operation.

Accordingly, the task of the present invention is to undertake such measures in an arrangement for the lifting and lowering of a window that the closing operation of the door is improved, especially with regard to noise. However, it is to be also assured thereby that the window, in its closed position, is effectively retained in position by sealing members on the side of the body, especially with framelessly guided windows.

The underlying problems are solved according to the present invention in that the driving motor is adapted to be additionally influenced by a control installation in such a manner that preferably during the opening of the door, the windowpane is displaced automatically into a lowered position and after completed closing operation of the door, is raised again into its upper end position.

The advantages principally achieved with the present invention reside in that prior to the door closing operation an automatic lowering of the window is achieved by the control installation cooperating with the driving motor so that during the closing of the door, the air additionally pressed from the vehicle outside into the passenger space can again escape through the gap between window and body. The door closing noises are considerably reduced thereby.

Therebeyond, the use of the control installation of the present invention in conjunction with the electric window lifter arrangement may include for a frameless windowpane a sealing member retained at the body which, in addition to the customary inwardly disposed support section, includes an outwardly disposed leg surrounding the windowpane. The windowpane is thus retained in position both on the inside and also on the outside, whereby a lifting of the window off from the inwardly disposed support section of the sealing member by reason of the vacuum prevailing on the outside of the vehicle is avoided. Since the control installation lowers the window immediately with an unlocked door lock and with a pressed-in door-actuating member and only lifts the same again after closing of the door is completed, the windowpane is out of engagement with the sealing member during the opening and closing of the door. A completely satisfactory opening and closing of the door is assured thereby. Additionally, wind noises are substantially avoided by the outwardly disposed leg of the sealing member.

These and other objects, features and advantages of the present invention will become more apparent from the following description when taken in connection with the accompanying drawing which shows, for purposes of illustration only, several embodiments in accordance with the present invention and wherein:

FIG. 2 is a schematic circuit diagram of a first embodiment of a control installation in accordance with the present invention;

FIG. 3 is a diagram of the electric signals in the embodiment of FIG. 2, plotted against time;

FIG. 6 is a diagram of the electric signals of the control installation according to FIG. 4 plotted against time.

Figure 1:
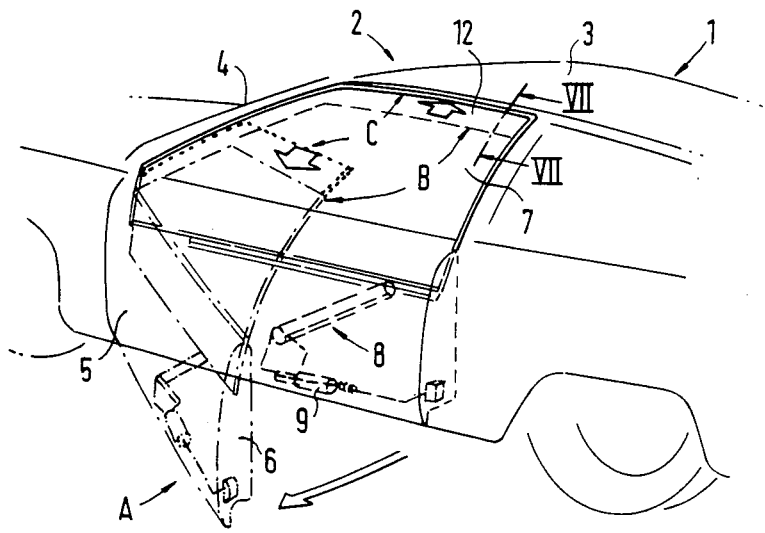
FIG. 1 is a somewhat schematic perspective partial side view of a motor vehicle.

Referring now to the drawing wherein like reference numerals are used throughout the various views to designate like parts, a partial area of a motor vehicle generally designated by reference numeral 1 is illustrated in FIG. 1, which includes a body generally designated by reference numeral 2 with a roof 3, a windshield 4 and a door 5. The door 5 is pivotally mounted in a customary manner at a hinge column and includes a door body 6 in which is arranged a windowpane 7 displaceable in the vertical direction. The opened position A of the door 5 is indicated in FIG. 1 in dash and dotted lines.

Figure 4:
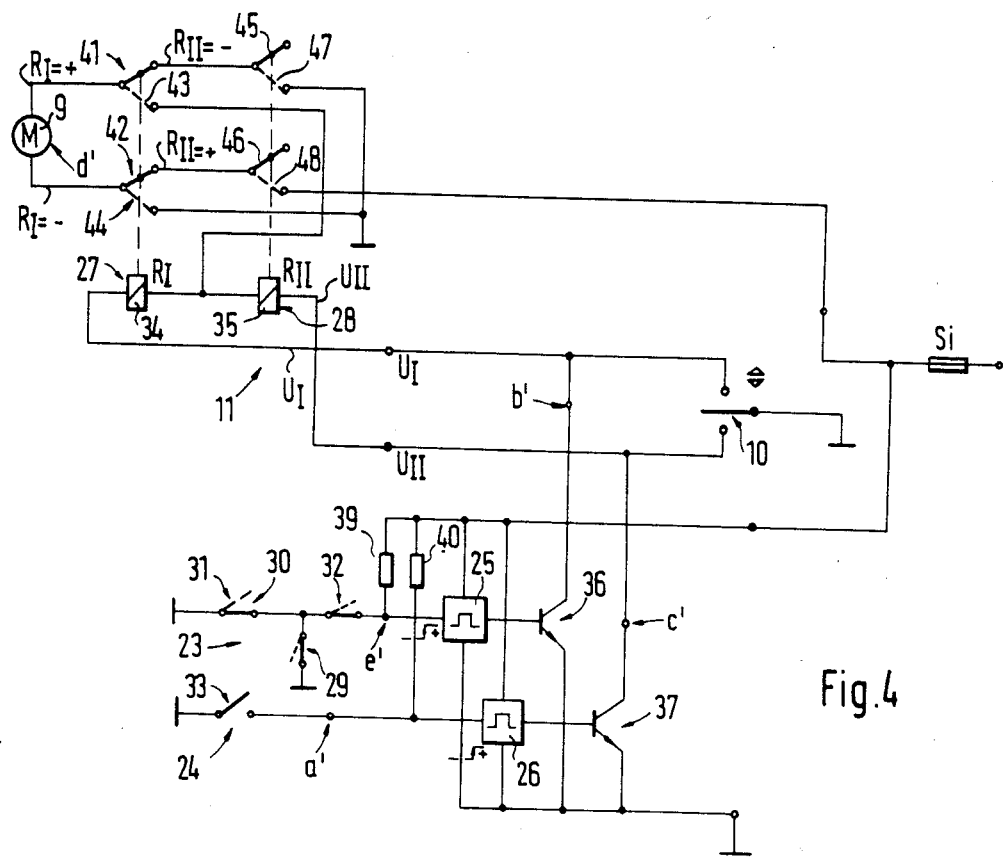
FIG. 4 is a schematic circuit diagram of a further embodiment of a control installation in accordance with the present invention.

An arrangement is provided for the lowering and lifting of the window 7, which includes a window lifter mechanism generally designated by reference numeral 8 of any conventional construction with an electric driving motor 9 and an operating switch 10 which is illustrated in FIGS. 2 and 4. The operating switch 10 is constructed as a conventional rocker-type switch so that during actuation of the operating switch 10 in one direction, the window 7 is lowered and during actuation in the other direction the window 7 is raised. The adjusting movement of the window 7 takes place for as long a time as the operating switch 10 is actuated.

Therebeyond, the driving motor 9 is connected with a control installation generally designated by reference numeral 11 (FIG. 2) in such a manner that during the opening of the door 5, the window 7 is automatically displaced into a lowered position B (FIG. 1). After completed closing operation of the door, the window 7 is displaced into its upper end position C (FIG. 1) by the control installation 11. Owing to the control installation 11, a gap 12 (FIG. 1) remains between the window 7 and the body 2 during the closing of the door 5, through which a part of the air present in the passenger space can escape. As a result thereof, the door-closing noises are considerably reduced.

The control installation 11 according to the first embodiment illustrated in FIG. 2 includes a switching device generally designated by reference numeral 13 which becomes effective during opening and closing of the door 5, a timing circuit stage 14 effecting the lowering of the window 7, a timing circuit stage 15 effecting the raising of the window and a power or output switching device 16.

The switching device 13 is formed by a customary door contact switch 17 which additionally controls the interior light of the passenger space by way of a switch or relay (not shown). Additionally, the control installation 11 includes a resistance 18 which is connected between a positive terminal of a battery 19 and a line 20 leading to the timing circuit stage 14. However, the resistance 18 may also be integrated into the timing circuit stage 14, 15.

The control installation 11 which is made of conventional electronic components, known as such in the art, has the following function: With a closed door 5, the contact switch 17 is open and owing to the resistance 18, the battery voltage (12 volts) exists at the inputs of the two timing circuit stages 14 and 15. By opening the door 7, the door contact switch 17 closes, as a result of which a voltage change occurs at the inputs of the timing circuit stages 14 and 15, and more particularly from +12 volts to ground. Only the timing circuit stage 14 responds to this change of the voltage in the negative direction. The timing circuit stage 14 thereupon produces for a predetermined length of time a pulse signal to the power switching device 16. The direction of rotation of the driving motor 10 for the lowering of the window 7 is thereby controlled in the power switching device 16. If the predetermined duration of the timing circuit stage 14 has been ended, then no pulse signal is produced any longer and the driving motor 10 is therefore no longer driven, i.e., the window 7 remains in the preexisting position. The predetermined time duration is so selected that the window 7 is lowered a predetermined distance, for example, 5 to 10 centimeters. However, the possibility also exists to so select the time duration that the window 7 is completely lowered. According to FIG. 2, the contacts 21 and 22 for the operating switch 10 of the driving motor 9 are integrated in the power switching device 16, whereby a closed contact 21 effects the lowering and a closed contact 22 the lifting of the window 7.

During the closing of the door 5 the door contact switch 17 is again opened. Thereafter a voltage change from ground to +12 volts occurs at the inputs of the timing circuit stages 14 and 15. Only the timing circuit stage 15 responds to this change in voltage which thereupon produces for a predetermined length of time a pulse signal applied to the power switching device 16. The direction for the lifting of the window 7 is controlled thereby in the power-switching device 16. The driving motor 9 now displaces the windowpane 7 into its closed end position C.

The time duration of the timing circuit stages 14 and 15 may be either of equal length or, the timing circuit stage 15 may be designed for a longer period of time. It is achieved thereby that a window 7, already partially lowered by the operating switch 10, is lowered during the opening of the door 5 only by a slight amount whereas during the closing of the door 5, the window 7 is raised completely into its upper end position C.

Figure 7:
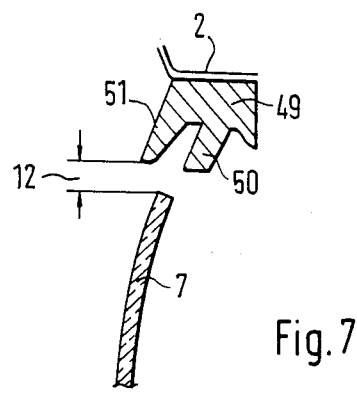
FIG. 7 is a cross-sectional view, on an enlarged scale, taken along line VII—VII of FIG. 1.

The control installation 11 illustrated in FIG. 2 is of simple construction and is applicable above all for windows 7 guided in frames. However, it is also suitable for windows 7 guided framelessly above the belt line, which abut with a corresponding prestress, as viewed in the vehicle transverse direction, at the sealing member 49 on the body side (FIG. 7). In FIG. 3, the timing pulses of the control installation 11 of FIG. 2 are plotted against time, and more particularly as they appear at points a, b, c and d (FIG. 2) of the control installation 11.

According to a further embodiment illustrated in FIG. 4, the control installation 11 includes a switching device generally designated by reference numeral 23 which becomes effective during the opening of the door 5, a switching device generally designated by reference numeral 24 which becomes effective during the closing of the door 5, a timing circuit stage 25 effecting the lowering of the window, a timing circuit stage 26 triggering the lifting of the window and power or output switching circuits 27 and 28.

The switching device 23 becomes effective when the door lock is unlocked (lock detent switch 29 is thereby open) and the door-actuating member 30 is pressed in (switch 31 of an inner, respectively, outer door pushbutton is thereby also open). If the lock of the door is locked and therewith the lock detent switch 29 is closed, then the switching device 23 is not actuated, notwithstanding a pressing-in of the door-actuating member 30 (theft safety feature).

Therebeyond, the switching device 23 can be triggered or actuated by an actuating switch 32 of an electric convertible top if the latter assumes its open position.

Figure 5:
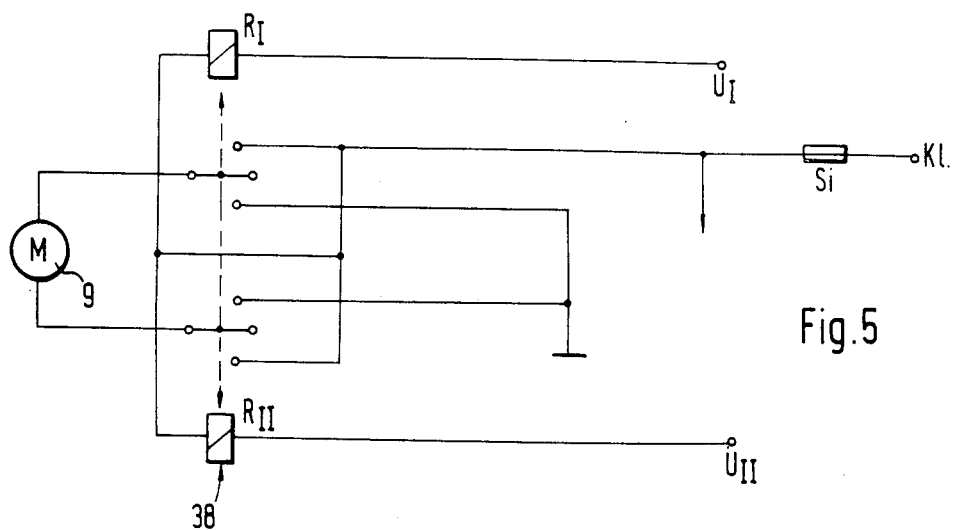
FIG. 5 is a schematic circuit diagram of the driving motor with a double relay for changing the direction of rotation in accordance with the present invention.

The switching device 24 is formed by a door contact switch 33 which is open with a closed door 5. The two timing circuit stages 25 and 26 both respond to a voltage change from ground to battery voltage (12 volts). The power switching devices generally designated by reference numerals 27 and 28 are formed by relays 34 and 35. For this reason, drivers 36 and 37 are connected into the connecting lines between the relays 34 and 35 and the corresponding timing circuit stages 25 and 26. The two relays 34 and 35 are so connected that one direction of rotation of the driving motor 9 has priority. According to FIG. 4, the relay 34 and therewith the lowering of the window 7 has priority. It is assured thereby that during opening of the door 5 and during simultaneous actuation of the manual operating switch 10 in the direction of window "lifting", the window 7 is nonetheless lowered. In lieu of the two relays 34 and 35, a double relay 38 may be used for the control of the driving motor 9 (FIG. 5).

In addition to the operating switch 10 for the driving motor 9, the control installation 11 according to FIG. 4 includes two further resistances 39 and 40 for the two different switching functions (switching devices 23 and 24).

The control installation 11 illustrated in FIG. 4 has the following function: With a locked door 7, ground exists at the input of the timing circuit stage 25 and battery voltage (12 volts) exists at the input of the timing circuit stage 26. If with an unlocked lock (door detent lock 29 is open), the door actuating member 30 is depressed (switch 31 also open), respectively, he actuating switch 32 for the convertible top is opened, then a voltage change from ground to 12 volts appears at the input of the timing circuit stage 25 by way of the resistance 39. Thereafter, the timing circuit stage 25 supplies a pulse signal to the relay 34 by way of the driver 36. The relay 34 brings about a closing of the contacts 41 and 42 into the positions 43 and 44, as a result of which the driving motor 9 lowers the window 7 corresponding to the time duration of the pulse signal of the timing circuit stage 25. Additionally, during the opening of the door 5, the door contact switch 33 is closed so that a voltage change from battery voltage (12 volts) to ground occurs at the input of the timing circuit stage 26; however, the timing circuit stage 26 does not respond to this negative voltage change.

During the subsequent closing of the door 5, the door contact switch 33 is opened and a voltage change from ground to battery voltage (12 volts) occurs at the input of the timing circuit stage 26. The timing circuit stage 26 now applies a pulse signal to the relay 35 by way of the driver 37. The relay 35 is energized, as a result of which the contacts 45 and 46 are displaced into the positions 47 and 48. As a result thereof, the driving motor 9 is controlled to rotate in the direction of rotation "window lifting" for a period of time corresponding to the time duration of the pulse signal of the timing circuit stage 26. The time duration of the timing circuit stages 25 and 26 may be designed corresponding to the timing circuit stages 14 and 15 of the first embodiment.

The signal pulses of the control installation 11 according to FIG. 4 which appear at points a', b', c', d' and e' are plotted against time in the diagram of FIG. 6.

A particularly advantageous application for the control installation 11 illustrated in FIG. 4 exists with windowpanes which are guided without frames. Since the control installation 11 effects a lowering of the window during actuation of the inner, respectively, outer door pushbutton (if the door lock is unlocked), the possibility exists of providing on the sealing member 49 (FIG. 7) arranged at the body, in addition to an inwardly disposed support lip 50, an outwardly disposed leg 51 surrounding the windowpane 7. As a result of the leg 51 which is constructed in a relatively form-rigid manner, a lifting off of the window 7 toward the vehicle outside is prevented and wind noises are substantially avoided. Since the window 7 is retained in its closed position between the inwardly disposed support lip 50 and the outwardly disposed leg 51 of the sealing member 49, it is not necessary for the windowpane 7 to abut at the inwardly disposed support lip 50 under prestress. The leg 51 has about the same height as the support lip 50.

By the cooperation of the actuating switch 32 for an electric folding roof or convertible top, for example, as disclosed in the German patent application No. P 3,127,524.9, with the control installation 11, it is achieved that when depressing the actuating switch 32, at first the window 7 is lowered and thereafter the opening of the convertible top takes place. An easier opening of the convertible top is achieved as a result of the lowered window 7 since the friction forces between the sealing member 49 of the convertible top and the window 7 are eliminated.

While we have shown and described several embodiments in accordance with the present invention, it is understood that the same is not limited thereto but is susceptible of numerous changes and modifications as known to those skilled in the art, and we therefore do not wish to be limited to the details shown and described herein but intend to cover all such changes and modifications as are encompassed by the scope of the appended claims.

We claim:

1. An installation for lowering and lifting a window of a motor vehicle door, comprising window lifter means including a driving motor and an operating switch for controlling the driving motor, and additional control means for controlling the driving motor in such a manner that the window is automatically displaced into a lowered position during the opening of the door and is raised again into an upper end position after completion of the door closing operation, said control means including at least one switching means which becomes effective during opening and closing of the door, said switching means being operatively connected with timing circuit means responsive to a voltage change, and power switching means, the timing circuit means applying a pulse signal to the power switching means operable to set the driving motor into operation for a defined length of time and in a defined direction of rotation.

2. An installation according to claim 1 wherein the at least one switching means is formed by an existing door contact switch.

3. An installation with a door lock means and a door actuating member according to claim 1, wherein one of the first-mentioned switching means becomes effective during opening of the door in dependence on the lock means being unlocked and the door actuating member being actuated, whereas another of the first-mentioned switching means which is operable during the closing of the door is formed by a door contact switch.

4. An installation for lowering and lifting a window of a door of a motor vehicle which is equipped with an electrically actuatable convertible top means according to claim 1, wherein the first-mentioned switching means becomes effective in dependence on an actuating switch for the convertible top means.

5. An installation according to claim 1, wherein the timing circuit means effecting the lowering responds to a voltage change from a predetermined voltage to ground whereas the timing circuit means effecting the lifting of the window responds to a voltage change from ground to a predetermined voltage.

6. An installation according to claim 1, wherein both timing circuit means respond to a voltage change in the same direction.

7. An installation according to claim 6, wherein the voltage change is from ground to a positive battery terminal.

8. An installation according to claim 1, wherein each power switching means is formed by one of a relay and a transistor.

9. An installation according to claim 1, wherein the timing circuit means effecting lowering of the window and the timing circuit means effecting lifting of the window are designed for the same duration of time.

10. An installation according to claim 1, wherein the timing circuit means for effecting lifting of the window is designed for a greater time duration than the timing circuit means effecting the lowering of the window.

11. An installation for lowering and lifting a window of a door of a motor vehicle which is equipped with an electrically actuatable convertible top means according to claim 5, wherein the first-mentioned switching means becomes effective in dependence on an actuating switch for the convertible top means.

12. An installation according to claim 5, characterized in that the at least one switching means is formed by an existing door contact switch.

13. An installation with a door lock means and a door actuating member according to claim 4, wherein one of the first-mentioned switching means becomes effective during opening of the door in dependence on the lock means being unlocked and the door actuating member being actuated, wherein another of the first-mentioned switching means which is operable during the closing of the door is formed by a door contact switch.

14. An installation according to claim 4, wherein the timing circuit means effecting lowering of the window and the timing circuit means effecting lifting of the window are designed for the same duration of time.

15. An installation according to claim 4, wherein the timing circuit means for effecting lifting of the window is designed for a greater time duration than the timing circuit means effecting the lowering of the window.

* * * * *